March 20, 1962 M. E. SILBERGER 3,025,938
MOTOR BRAKE

Filed April 7, 1955 4 Sheets-Sheet 1

INVENTOR.
MARVIN E. SILBERGER
BY James T. Bethell
ATTORNEY

INVENTOR.
MARVIN E. SILBERGER
BY
James T Bethth
ATTORNEY

March 20, 1962  M. E. SILBERGER  3,025,938
MOTOR BRAKE

Filed April 7, 1955  4 Sheets-Sheet 4

INVENTOR.
MARVIN E. SILBERGER
BY
James T. Bethell
ATTORNEY

United States Patent Office
3,025,938
Patented Mar. 20, 1962

3,025,938
MOTOR BRAKE
Marvin E. Silberger, York, Pa., assignor to American Chain & Cable Company, Inc., Bridgeport, Conn., a corporation of New York
Filed Apr. 7, 1955, Ser. No. 499,841
8 Claims. (Cl. 192—2)

This invention relates to brakes, and more particularly to a solenoid motor brake for an electric motor.

An example of application of the invention is an electric hoist. Electric motor driven suspended hoists usually involve a winding drum for cable or a pocket wheel for chain, a gear train, a mechanical brake and an electric brake. The mechanical brake is intended to support the load except when the motor is rotated to cause rotation of the drum (or wheel) in a raising or lowering direction. When all is working well, the motor brake has the function of stopping the motor when power is shut off. This prevents the load from drifting up or down as the motor coasts to a stop. However, because of the fact that hoisted loads are dangerous unless safely suspended, the motor brake is supposed to be strong enough to retain the load in position even though the mechanical brake fails because of wear, greasy lining or some other defect.

It has been found that the motor brake, because of the relatively high duty performed by it, and because of the method of operation, requires careful adjustment. Such brakes are operated, in a typical hoist, by springs which press shoes against the brake drum. To release, a solenoid operates to force the shoes away from the drum, against the resistance of these springs. As the brake lining material wears away, some adjustment must be made in order that the brake will perform its assigned task when applied.

Brakes of this type have in the past employed various forms of linkage, involving sometimes cams and levers. Adjustment has been achieved by moving various parts of the linkage, and by altering the tension of the springs. However, serious maladjustments can very readily occur in the mechanism in the usual brake, although the device appears to operate correctly. For example, the solenoid plunger may not enter the solenoid coil fully when the power is turned on. This, of course, permits a larger current through the solenoid than the solenoid is designed to withstand for any period, resulting in an early breakdown of the solenoid. Also, as much repair and adjustment work of this nature is done at night, when the plant is idle, it frequently happens that the brake is adjusted and tested at a higher voltage than is available in normal use. The machine then operates on reduced voltage when the plant is in operation. The reduced voltage may be insufficient to operate the solenoid and fully release the brake. The machine will run, but the overheating caused by the brake is sufficient to damage the brake lining and even cause fires.

Although a correct procedure, coupled with considerable judgment, will result in properly adjusted brakes, such is not always available. The procedure may be forgotten, or its importance minimized in the mind of the mechanic. The fact that the parts move in the required direction as the device is tested, may seem to him sufficient evidence that proper adjustment has been made. Early breakdown, due to the burning of the solenoid or brake lining, is the only indication that such adjustment was not in fact correct. Or, if the adjustment is at fault in the other direction, the brake may operate correctly, but a tendency to drift, after a relatively short time, indicates that the brake was adjusted without sufficient allowance for wear of the lining.

Another difficulty with some types of motor brakes as installed in hoists is that the electrical elements of the hoist (relays, contactors, and the like) must be removed to gain access to the mechanical elements to be adjusted. Under the rules obtaining in many establishments, electrical equipment can be removed and connected only by electricians, while the mechanical elements require attention of another craft. Delays are thus caused until two men are simultaneously available.

In view of the above deficiencies in electric brakes as presently made, it is a primary object of this invention to provide an electric brake which is readily adjustable.

It is a further object of the present invention to provide a motor brake which cannot be wrongly adjusted without difficulty.

It is a further object of this invention to provide a motor brake in which correct adjustment is indicated in an unmistakeable manner.

It is a further object of the present invention to provide a motor brake with a solenoid of the smallest capacity possible.

It is a further object of the present invention to provide a hoist in which the adjustment of the mechanical parts of the motor brake does not entail the performance of work properly performed by electricians.

It is a further object of the present invention to provide a brake with protective devices to prevent operation of the braked machine in the event that the electric motor brake does not release.

Referring now to the drawings, which illustrate a preferred form of the present invention—

FIG. 6 is a diagrammatic showing of the electrical connections employed in a typical hoist.

Figure 1:
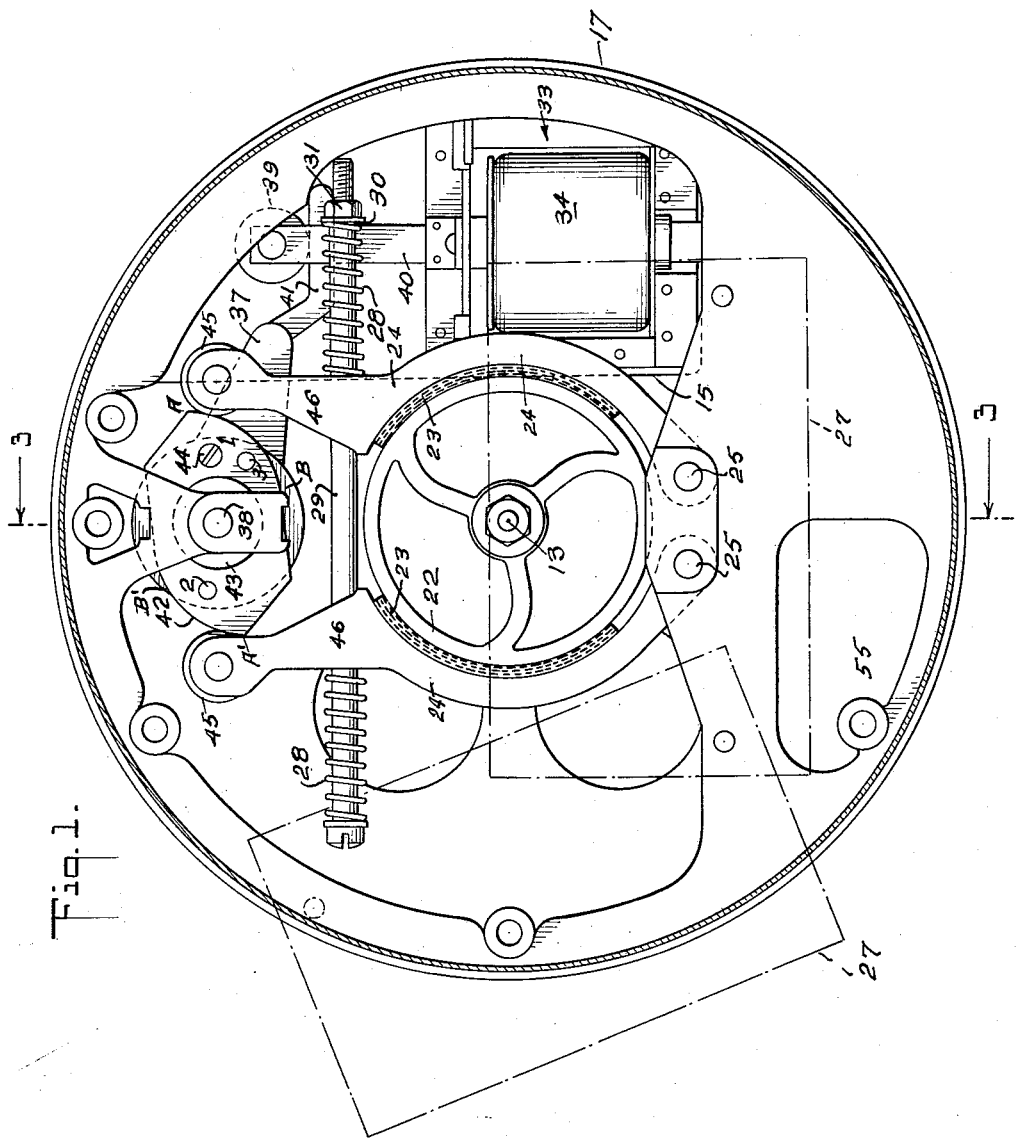
FIG. 1 is an end view of a hoist, with the cover removed, and certain electrical elements indicated in broken lines.
Figure 2:
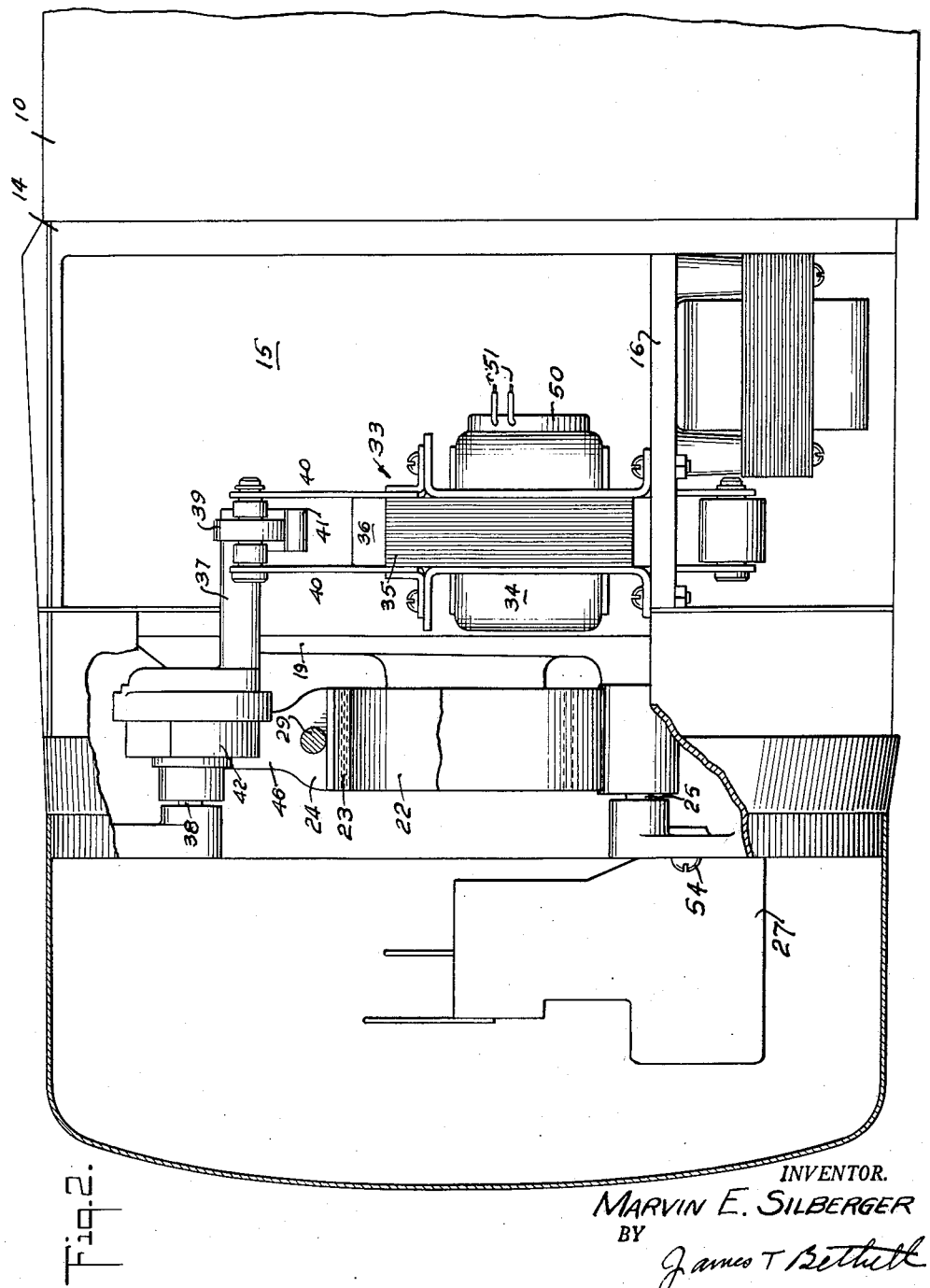
FIG. 2 is a side view of the end of the hoist shown in FIG. 1, with parts broken away.

Referring now to the drawings in detail:

A frame 10 of generally cylindrical form, shown in FIG. 2 is supplied with a suitable lug for suspension of the hoist from a trolley or beam. Within this frame is a winding drum for holding the wire rope to which the traveling hook is secured, or which is reeved through the traveling block. Within this frame is journalled a hollow shaft 11, seen in FIG. 3. This shaft is journalled on bearing 12 and another bearing at its outboard end which is mounted in the end of an electric motor (not shown) which is in turn secured to the right hand end of the frame 10.

Secured to the left hand end of the frame 10 is a casting 14, which is in effect a gear case, and which, incidentally, supports the bearing 12 mentioned above. As best seen in FIG. 1, a wall 15 of generally vertical aspect is connected with the bottom wall 16 of this gear case, the gearing lying (in FIG. 1) to the left of the wall. This leaves considerable space to the right (in FIG. 1) which is utilized as will be presently set forth. A cover plate 17 extends around this space making the general aspect of the device when the plate is in place that of a cylinder.

Within the gear case the hollow shaft 11 is keyed to a gear 18. Passing through the center of the shaft 11 and passing out of the end wall 19 of the gear case is a shaft 13, which at one end is splined for coupling to a motor shaft, and carries, within the gear case, a pinion 20. This pinion, by means of a train of gears, is connected to the gear 18, whereby the gear 18 and with it shaft 11 will be rotated by rotation of the motor shaft. A mechanical brake, 21, of conventional form, is included in the gear train. None of this construction is claimed to be novel, and is included in the description merely to indicate a structure which will cause shaft 11 to rotate upon rotation of the shaft 13, and cause shaft 11 to remain stationary upon holding of shaft 13, regardless of whether the mechanical brake restrains the gear train or not.

For the purpose of preventing hook drift, the motor must be stopped as rapidly as possible when power is shut off, as was pointed out before. This is accomplished by means of a brake wheel 22 splined to the shaft 13. Referring particularly to FIG. 1, the brake wheel is engaged by sections of brake lining material 23 which are secured to a pair of brake shoes 24. Each of these shoes 24 is pivoted to pins 25 passing through suitable bores formed in the casting forming the end wall 19. These pins are made removable by having a groove 26 in the end of each, and are normally prevented from working out by the switch assembly 27 which in use is in the position shown in FIG. 2.

In order to exert a braking effect upon the brake wheel 22, the brake shoes must be urged together. This is done by means of springs 28. A long bolt 29 passes through a suitable bore in each of the brake shoes, and the head and the nut on the opposite ends of the bolt compress the springs against the outer surfaces of the brake shoes. It will be noted that the bolt is shouldered at 30, so that the nut 31 can be driven on only to the shoulder, which is its normal correct position.

The springs 28 are as long as is necessary for them to exert, over the entire range of wear of the brake lining, the correct force on the brake shoes to operate correctly. This is easily done with the springs shown. In general, an adjustment is usually attempted by compressing the springs when the brake begins to fail; this adjustment is impossible in the shown structure, and, therefore, maladjustment of the springs is not a problem.

As the brake must be released when the hoist is operated, a solenoid 33 is supplied, which is energized when the motor circuit is closed. This solenoid comprises a coil 34 suitably supported and supplied with core material 35, as is customary. A plunger 36 of usual form is drawn into the coil upon energization of the coil.

In order to cause movement of the plunger 36 to operate the brake shoes 24, a crank 37 is provided. This crank is mounted for rotational movement in the hoist frame by means of pin 38. A roller 39, journalled between side plates 40 secured to and forming part of the plunger 36, engages the upper side of the arm 41 of the crank 37. Thus downward movement of the plunger 36 causes clockwise rotation of the crank 37 as shown in FIG. 1.

In order to utilize this rotation of the crank 37 as a means for releasing the brake, a novel cam arrangement is provided. A cam 42 is adjustably mounted on a cylindrical portion 43 formed on the crank 37, said portion 43 being concentric with the pin 38 about which the crank 37 rotates. A screw 44 passing through an opening in the cam 42 and entering a tapped hole in the crank 37 normally prevents rotation of the cam with respect to the crank.

As seen in FIG. 1, this cam is symmetrical about the axis of the pin 38. The surface from A to B is identical to that from A' to B', and can generally be described as of decreasing radius from point A to point B.

The working periphery of the cam is engaged by a pair of rollers 45, rotatably mounted on extensions 46 integral with the brake shoes 24. From what has been set forth above, it can be seen that rotation of the cam 42 in a clockwise direction causes the brake shoes to separate, releasing the brake. It so happens that the cam surfaces have sufficient steepness so that springs 28 urging the brake shoes together cause counter-clockwise rotation of the cam, turning the crank 37 in that direction and lifting the plunger 36 of the solenoid. Thus, no spring is necessary to lift the plunger or rotate the crank in a counter-clockwise direction and, as a result, the construction shown engenders no lost motion anywhere in the system.

Cost and the space available limit the size of the solenoids. Consequently, the work per stroke available from the solenoid is limited. The innermost position required of the brake shoes is that taken when the brake lining is almost worn out, and the brake is on. The outermost position required is that in which the brake is released, when the brake lining is new. If it were desired to have the solenoid capable of release throughout this entire range of movement against the force of the springs 28, which would be necessary if the device were to operate without adjustment for the life of the brake lining, the solenoid would be large and expensive. Accordingly, an adjustment is provided in the mechanism, whereby after a certain amount of wear, the brake can be adjusted. This decreases the work required of the solenoid. At the same time, the adjustment means is such that any maladjustment can be readily seen.

In FIG. 1 there will be observed through the cam 42 a pair of holes, labelled 2 and 3, which are on a common circle with the hole occupied by the screw 44, which hole is labelled 1. These numbers are actually marked on the metal of which the cam is made. When cam 42 is in the position shown, with the hole 1 occupied by the screw 44, which is as before set out, threaded into a hole in the crank, the cam will, as the lining wears, rotate, together with the crank, so that the roller in contact with the surface A—B will roll over the cam between A and a point about a third of the distance to B. Further wear of the lining will not cause further rotation of the cam and crank because of limitations of stroke of the solenoid plunger. Accordingly, the brake will not hold, and the hoist hook and drive motor rotor will drift, indicating that adjustment is necessary. To do this, the screw 44 is removed, the cam rotated, and the screw inserted in the hole 2 and threaded into the crank. The middle third of the working faces of the cam are then in engagement with the rollers on the ends of the brake shoes, and wear on the lining again proceeds until the brake no longer holds sufficiently. Adjustment is then made to hole 3.

If a hole of lower number than proper is attempted for use, the brake lining will not touch the wheel and, therefore, no braking action will take place. On the other hand, if a higher number than proper is attempted, the solenoid plunger will not lift out of the solenoid. Therefore, on energizing of the coil no motion of the arm 37 will take place and the brake will not release. It will be observed that hole 2 is opposite 1 and 3, rather than between them. This is solely because the three holes, if on the same side of the cam, would be so close to each other as to overlap; an unsatisfactory arrangement mechanically.

It is well known that solenoids of the type utilized are designed to exert a pull on the plunger which varies as the position of the plunger changes. In general, the force available increases as the plunger enters the coil.

Previous constructions of brake releases of this type utilizing linkages can conceivably be designed and adjusted so that the resistance overcome by the solenoid has a relation to the force available from the solenoid, but adjustment after wear, changing the linkage relationships, cause such relation to be lost. Accordingly, the solenoids in the prior art are larger than they would be if the relation between force and resistance could be accurately maintained.

Figure 4:
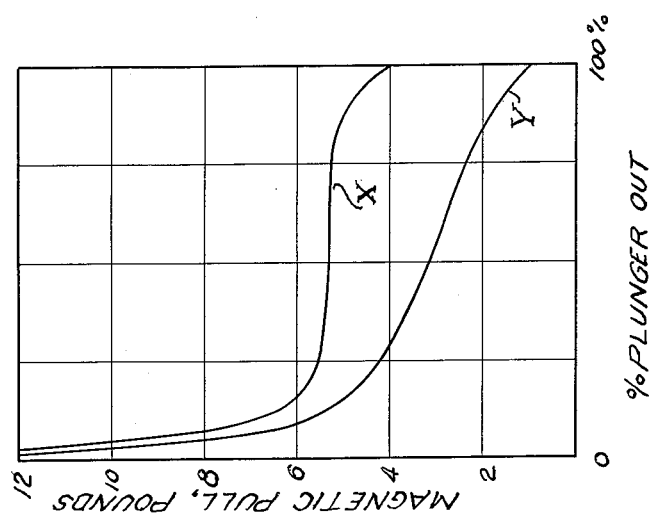
FIG. 4 is a force-displacement diagram for two typical solenoids.

In the shown form of the device, one-third of the cam surface is utilized for any one adjustment of the cam. Referring to FIG. 4, the roller and cam are shown in the position they assume when the lining is new and the brake applied. When the lining is worn enough to almost require replacement the cam will be rotated by the reaction of roller 45 to a position in which the point of tangency between the cam and roller is at C. The solenoid must therefore be capable of rotating the cam from a position in which C is tangent to the roller to a position in which a point beyond A is tangent to the roller.

For the sake of illustration, in FIG. 4 there is shown a pull-displacement curve for each of two commercially available solenoids. The curve Y is of a solenoid characterized by a low pull, about a pound, when the solenoid plunger is out as far as its construction permits. The force available rises more or less gradually as the plunger enters the solenoid. The curve X, on the other hand, shows a relatively high starting pull which remains fairly uniform for three-quarters of the stroke, and then increases.

Figure 3:
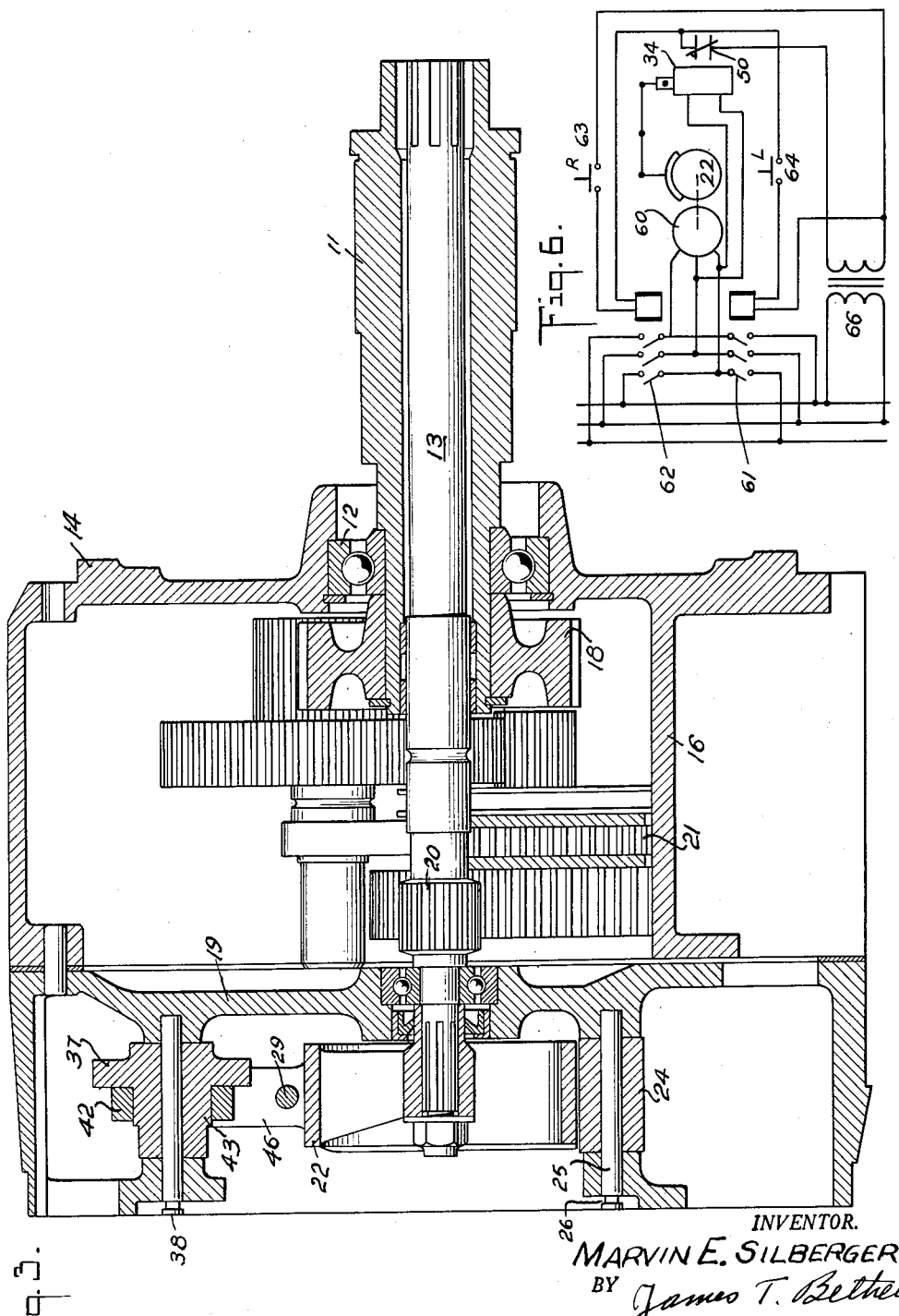
FIG. 3 is a section on line 3—3 of FIG. 1, showing certain of the operating parts of the hoist.

It will be appreciated that the selection of one or the other of these solenoids is affected by price, size, and other considerations. The mere examination of the curves in FIG. 3 shows that the solenoid corresponding to curve X produces more work per stroke, but it may be bulkier, more expensive or otherwise undesirable.

It is a simple matter for the designer to lay out a cam section from A to C, taking into consideration the angularity of the crank arm 41, the shape of the curve X or Y, and the force urging the roller against the cam, so that the torque exerted through the crank by the solenoid has a definite relation to the opposing torque resulting from the pressure of the rollers on the cam surfaces. If the solenoid the pull force of which is represented by the curve Y is selected, a cam surface something like that shown in solid lines in FIG. 4 results. If the solenoid having a pull curve similar to X is selected, a cam surface somewhat like that of the dotted lines results. The dotted line is exaggerated for clarity, and the actual cam is not so sharply curved at point C, for instance.

Figure 5:
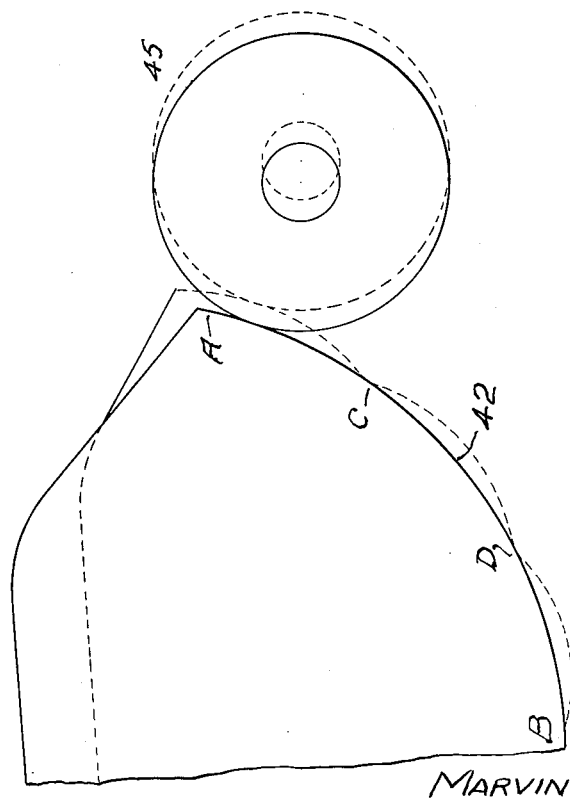
FIG. 5 is an enlarged, fragmentary view of certain parts of the operating mechanism.

The above details of design are refinements to which the described construction readily lends itself. As should be evident, subsequent adjustment by altering the position of the cam does not alter the relationships between the cam shape and the solenoid pull but simply uses another region, e.g., from C to D of the cam in FIG. 5. That region is also designed as the region from A to C. Thus the designer can be sure that once he matches the torque exerted by the pressure of the rollers 45 on the cam with a torque produced by the known pull of the solenoid by properly shaping the cam, such matching cannot be destroyed in any subsequent adjustment of the mechanism.

It sometimes happens that usage of a hoist or other machinery, because of the particular job being done, requires that the machine be jogged, causing the solenoid to be operated rather frequently. All brake solenoids have some limitation as to the number of operations per minute, which is sometimes ignored by the operator. Consequently, the solenoid becomes overheated and eventually fails. Also, conditions in the plant may cause temporary low voltage, and the solenoid, as a result will not operate. Current through the solenoid is dependent upon the applied voltage and the position of the plunger. A current greater than that which the solenoid is designed to stand (except momentarily) passes through the solenoid, heating it and eventually destroying it. The motor operates, in that it rotates despite the fact that the brake is still applied although the motor is thus greatly overloaded.

In order to obviate this, in the present hoist a thermo responsive element can be attached to or embedded in the winding of the solenoid. It is indicated in FIG. 2 as the small rectangle at 50, with lead wires 51 running from it for proper coupling in the circuit. In the event that jogging is too long continued, or failure of the plunger 36 to properly seat causes the solenoid to overheat, the heat responsive element 50, which is simply a thermostat, opens. The element 50 is connected in the line to cut out the main power to the machine, so that neither the solenoid nor the motor operates until the solenoid cools.

Referring particularly to FIG. 6, the connections are set forth in detail showing one form of electrical arrangements for operating the hoist, for illustrative purposes. The three phase motor 60 is connected to the supply line by relay contacts 62 and 61. Contacts 62, when closed, complete the connections to cause the motor to rotate to raise the load, and contacts 61 when closed, connect the motor in a fashion to cause it to lower the load. The corresponding relay coils are shown as connected to a transformer 66 across one phase of the supply line, through pushbutton switches 63 and 64, marked R and L for raise and lower. The brake wheel 22 is mechanically connected to the rotor of the motor, and the brake shoes are indicated by a single shoe for simplicity. The solenoid 34 is linked to the shoe so that on energization the shoe will be raised free of the brake wheel. For the purpose of energization, the solenoid is connected to a pair of the motor leads, so that operation of the motor is accompanied by a release of the brake. Thermostat 50, normally closed, opens upon excessive heating of the solenoid. As the thermostat is in the common line of the transformer 66, the relays 61 and 62 cannot close, and the machine will not operate at all until the temperature falls sufficiently to close the thermostat.

Referring particularly to FIG. 2, a switch assembly 27 is shown in outline. It was mentioned before that in hoists of this nature have in the past required electricians to disconnect the switch assembly before it can be removed for the purpose of allowing free access to the space obstructed by the assembly. In order to obviate this difficulty, the present switch assembly 27 is secured to the frame by screws, one of which is shown at 54. Upon removal of one of these screws, the switch assembly may be pivoted about the other, as shown in FIG. 1. The switch assembly 27 has various wires which are collected and are passed through opening 55, sufficient slack being left to permit the pivoting described. Thus no electrical work need be done to get at the mechanical parts of the brake.

I claim:

1. In a machine having a frame and a brake wheel mounted for rotation with respect to the frame, the combination of a pair of brake shoes mounted for movement into engagement with the brake wheel, spring means urging said shoes in wheel engaging direction, a cam mounted for movement with respect to the frame, said cam operatively engaging the brake shoes to move said shoes in wheel releasing direction, a mechanism of limited movement, means connecting said mechanism to the cam and adapted to move the cam a definite amount on such limited movement, the motion of the cam being sufficient to apply and release the brake shoes for part only of the range of brake wear, and a step by step adjustment between the mechanism and the cam permitting the utilization of different portions of the cam working surface under different adjustment.

2. In a machine having a frame and a brake wheel mounted for rotation with respect to the frame, the combination of a pair of brake shoes mounted for movement into engagement with the brake wheel, spring means urging said shoes in wheel engaging direction, said spring means being of a length to exert braking force on the shoes throughout the range of brake wear, a cam mounted for movement with respect to the frame, said cam operatively engaging the brake shoes and adapted on operation to move said shoes in wheel releasing direction, a mechanism of limited movement, means connecting said mechanism to the cam and adapted to move the cam a definite amount on such limited movement, the motion of the cam being sufficient to apply and release the brake shoes for part only of the range of brake wear, and a step by step adjustment between the mechanism and the cam permitting the utilization of different portions of the cam working surface under different adjustments.

3. In a machine having a frame and a brake wheel mounted for rotation with respect to the frame the combination of a pair of brake shoes mounted for movement into engagement with the brake wheel, spring means urging said shoes in wheel engaging direction, an element mounted on the frame for limited rotational movement, a cam mounted on said element for rotation therewith, means on said brake shoes engaging said cam, said cam upon rotation adapted to move said brake shoes on wheel releasing direction, the rotational movement of the cam being sufficient to apply and release the brake shoes for part only of the range of brake wear, and means for altering the angular disposition of the cam with reference to the element permitting the utilization of different portions of the cam working surface under different adjustments.

4. In a machine having a frame and a brake wheel mounted for rotation with respect to the frame, the combination of a pair of brake shoes mounted for movement into engagement with the brake wheel, spring means urging said shoes in wheel engaging direction, said spring means being of a length sufficient to exert a braking force on the shoes throughout the range of brake wear, means indicating the proper compression of the spring means to exert such a braking force on the shoes throughout the range of brake wear, a cam mounted on the frame for limited rotational movement, said cam operatively engaging the brake shoes to release the brake shoes upon rotation in one direction, the limited movement of the cam being sufficient to apply and release the brake shoes throughout part only of the range of brake wear, and means for adjustably altering, in a step by step manner the initial position taken by the cam with respect to the frame at the initiation of such limited rotational movement.

5. In a machine having a frame and a brake wheel mounted for rotation with respect to the frame, the combination of a pair of brake shoes mounted for movement into engagement with the brake wheel, spring means adapted to urge said brake shoes into braking relation with the brake wheel with a force sufficient to exert braking effort thereon throughout the entire range of brake wear, a crank mounted on said frame for limited rotational movement, said crank having a cylindrical portion concentric with its axis of rotation, a cam on the cylindrical portion of the crank for rotation with respect thereto, and means securing said cam to the cylindrical portion of the crank in two related positions with no intermediate position.

6. In a machine having a frame and a brake wheel mounted for rotation with respect to the frame, the combination of a pair of brake shoes mounted for movement into engagement with the brake wheel, spring means urging said shoes in wheel engaging direction, a cam mounted for rotation with respect to the frame and operatively engaging the brake shoes to move said shoes in wheel releasing direction, said cam having surfaces of an extent to apply and release the brake shoes throughout the entire range of brake wear, a mechanism of limited movement, means connecting said mechanism to said cam adapted to move the cam in the direction to apply the brake shoes to the brake wheel, the limited movement of the mechanism adapted to rotate the cam an amount sufficient to engage part only of the cam surfaces with the brake shoes, and means permitting the adjustable rotation of the cam with respect to the mechanism whereby different portions of the cam surface are adapted to be engaged by the brake shoes.

7. In a machine, an electric motor, a brake, a solenoid releasing said brake upon energization, a temperature responsive unit operatively associated with the solenoid operatively connected to the motor circuit and the solenoid circuit to prevent passage of current through either the solenoid or motor upon heating of the solenoid beyond a predetermined temperature.

8. In a machine, an electric motor, a brake, a solenoid releasing said brake upon energization, a thermostat responsive to the temperature of the coils of the solenoid, said thermostat being operatively connected to the motor circuit and the solenoid circuit to prevent passage of current through either the solenoid or the motor upon heating of the solenoid beyond a predetermined temperature.

References Cited in the file of this patent
UNITED STATES PATENTS

| | | |
|---|---|---|
| 2,178,591 | Lieberknecht | Nov. 7, 1939 |
| 2,399,605 | Schroeder | Apr. 30, 1946 |
| 2,591,510 | Clark | Apr. 1, 1952 |